United States Patent
Filosi et al.

(10) Patent No.: US 11,235,795 B2
(45) Date of Patent: Feb. 1, 2022

(54) METHOD FOR DETACHABLY FASTENING A SMARTPHONE HOLDER TO A SHOPPING CART

(71) Applicants: Andreas Filosi, Puchheim (DE); Franz Wieth, Puchheim (DE)

(72) Inventors: Andreas Filosi, Puchheim (DE); Franz Wieth, Puchheim (DE)

( * ) Notice: Subject to any disclaimer, the term of this patent is extended or adjusted under 35 U.S.C. 154(b) by 691 days.

(21) Appl. No.: 16/080,469

(22) PCT Filed: Feb. 24, 2017

(86) PCT No.: PCT/EP2017/054311
§ 371 (c)(1),
(2) Date: Aug. 28, 2018

(87) PCT Pub. No.: WO2017/144655
PCT Pub. Date: Aug. 31, 2017

(65) Prior Publication Data
US 2020/0346678 A1    Nov. 5, 2020

(30) Foreign Application Priority Data
Feb. 28, 2016 (DE) .................. 10 2016 002 278.7

(51) Int. Cl.
*B62B 3/14* (2006.01)
*H04B 1/3877* (2015.01)
*H04M 1/04* (2006.01)

(52) U.S. Cl.
CPC ......... *B62B 3/1424* (2013.01); *H04B 1/3877* (2013.01); *H04M 1/04* (2013.01)

(58) Field of Classification Search
CPC ................................................... B62B 3/1424
See application file for complete search history.

(56) References Cited

U.S. PATENT DOCUMENTS

| 8,672,199 | B1 | 3/2014 | Ditore et al. |
| 9,577,695 | B2 | 2/2017 | Huang |
| 2012/0119874 | A1 | 5/2012 | Ciervo et al. |
| 2014/0091192 | A1 | 4/2014 | Mersky |
| 2015/0032559 | A1 | 1/2015 | Sonnendorfer et al. |
| 2016/0241289 | A1 | 8/2016 | Wieth |

FOREIGN PATENT DOCUMENTS

| CN | 103717103 A | 4/2014 |
| CN | 104822579 A | 8/2015 |
| ES | 1076358 U | 2/2012 |
| WO | 2013153204 A1 | 10/2013 |
| WO | 2015055851 A1 | 4/2015 |
| WO | 2015090675 A1 | 6/2015 |

*Primary Examiner* — Hsinchun Liao
(74) *Attorney, Agent, or Firm* — Laurence A. Greenberg; Werner H. Stemer; Ralph E. Locher

(57) ABSTRACT

A method for detachably fastening a smartphone holder to a shopping cart includes a first and a second step. In the first step, a smartphone is placed on a seating of the holder. In a second step, the smartphone is locked in the seating. The locking of the smartphone in the seating activates a locking mechanism which automatically locks the holder, which is inserted in a seating provided for that purpose on the shopping cart, in the seating.

2 Claims, 1 Drawing Sheet

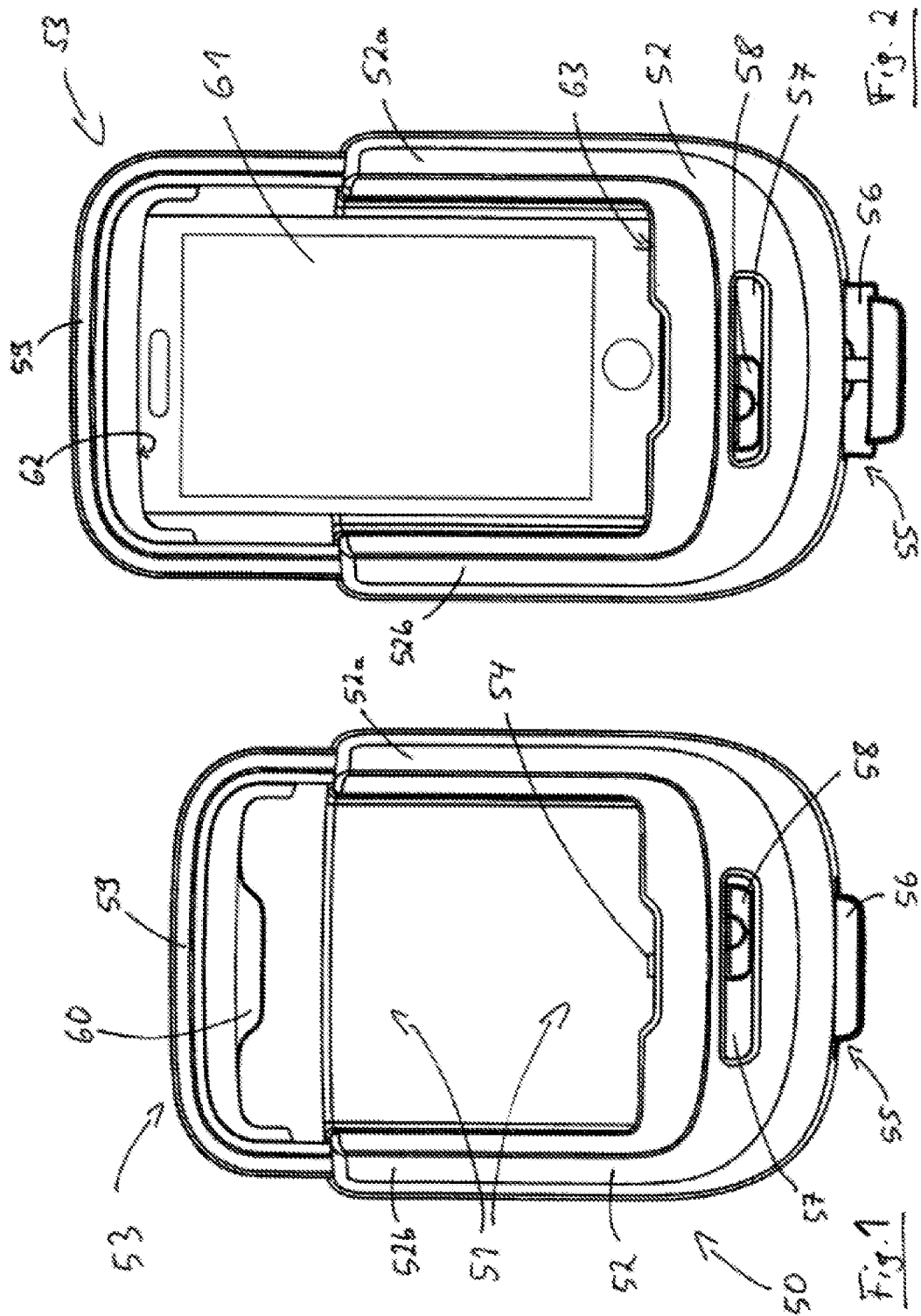

METHOD FOR DETACHABLY FASTENING A SMARTPHONE HOLDER TO A SHOPPING CART

BACKGROUND OF THE INVENTION

Field of the Invention

The invention relates to an improved method for detachably fastening a smartphone holder to a shopping cart, wherein in a first step, a smartphone is placed on a seating of the holder, and wherein in a second step, the smartphone is locked in the seating.

This application herewith adopts the disclosure in PCT/EP2014/072378 (WO 2015/055851). It addresses the problem of proposing advantageous additions, simplifications and/or alternatives for the holders, the interfaces, and fastening means described therein, with which the holder can be further improved.

SUMMARY OF THE INVENTION

This problem is solved by a method for detachably fastening a smartphone holder to a shopping cart with the features as claimed. Particularly advantageous embodiments are disclosed in the dependent claims.

A significant aspect of PCT/EP2014/072378 (WO 2015/055851) is the holder to be fastened and locked on a shopping cart or its handle, with which a telecommunications terminal, a so-called smartphone, brought into the store by the customer, can be fastened to the shopping cart. The smartphone inserted in the holder can also be locked, and so an unauthorized removal of the smartphone inserted in the holder on the shopping cart can be prevented. A locking mechanism in accordance with this application is a blockade produced by form-locking which is not releasable by a deformation of the latch but by removing the latch from its blockade position.

The holder provided for the smartphone has a seating, in which the smartphone can be held in a locked manner. In addition to the required first locking system, it comprises elements of a second locking system, with which the holder can be securely fastened to the shopping cart. In order to prevent an unauthorized removal of the smartphone from the holder, it is proposed that the unlocking of the first locking mechanism is only possible after an authorization check.

In an alternative embodiment of the holder described in PCT/EP2014/072378 (WO 2015/055851), an authorization check is executed and the actuator releasing the first locking mechanism is freely accessible on the holder. The authorization check according to the invention is preferably executed by means of a token associated with a specific holder. The token is inserted into the holder, and together, they are removed from the base station. Such a token can have a specific geometry which is verified by the holder. Similar to the previously described customer card, it preferably has a transponder, by means of which an electronic authorization check is executed in the holder. In order to be able to better differentiate said alternative mechanism from the first locking mechanism, it shall hereinafter be called fastening mechanism.

This embodiment is particularly advantageous because it can be adjusted to desired variations with significantly more flexibility. For example, the fastening mechanism and the second locking mechanism can be locked or released preferably jointly in one work step. For the customer, this facilitates the handling of the holder because the holder as well as the smartphone fastened in the holder is protected against unauthorized removal in a joint work step by the authorization check.

In a particularly preferred embodiment, the holder has no actuator for the fastening mechanism but instead has a switch or slider, the movement of which in the one direction locks the fastening mechanism, while the movement in the opposite direction releases the fastening mechanism. Such a slider or switch is advantageous because the required movement of the mechanism can be used not only for releasing but also for locking. In addition, the movement required for locking can also be used to brace the smartphone in its seating.

This embodiment allows for different alternatives for locking the smartphone in the holder and/or the holder on the handle.

In a preferred design of this embodiment, both the smartphone in the holder and the holder on the shopping cart are locked by moving the slider or the switch. This solution is advantageous because the smartphone can first be positioned in the holder, but it is not yet locked. It can thus be removed from the holder without effort. Only after the holder is inserted on the handle and the switch is actuated, smartphone and holder are locked simultaneously. This linkage allows for a secure coupling of the locking and the fastening mechanism.

Alternatively, it is possible to first insert the holder on the handle without fastening it. This provides the customer with the option of depositing the holder and freeing his/her hands. They are both locked only after the smartphone is also inserted.

In a further preferred design, it is possible to lock the smartphone in the holder after it is inserted without the holder already being inserted on the handle. Once the holder, with the smartphone held locked in the holder, is inserted on the handle, the holder is preferably automatically locked on the handle. In a particularly preferred embodiment, the locking of the smartphone in the holder arms the second locking mechanism. However, said second locking mechanism is only triggered when the holder is inserted on the shopping cart or shopping cart handle. This can be implemented in the following exemplarily described manner.

If the customer moves such a slider or switch from the position "Open" to "Closed," one or more states are preferably verified prior to the release of the token. A preferred verification is whether the holder is properly fastened to the shopping cart, for example, its handle. This position can be verified by means of a limit switch that signals that the holder has reached the desired end position on the shopping cart. In order to prevent an unwanted release, the holder is preferably locked in place in the end position. The verification of whether the holder has reached the desired end position on the shopping cart thus also allows for the automatic triggering of the second locking mechanism for locking the holder on the shopping cart or shopping cart handle.

Another preferred verification is whether a smartphone is properly fastened in the holder. This can also be verified by means of a corresponding limit switch. It is also advantageous to verify whether a token is inserted in the holder which can be read out. Preferably, this is also verified by means of a limit switch that is triggered by a completely inserted token.

After locking the smartphone in the holder and, if applicable, locking of the holder on the shopping cart, the token can be removed from the holder. If a token is inserted that is not permanently associated with said holder, the ID of said token must be read out and stored in the holder prior to the removal of the token. In case of a completed positive authorization check, the ID of the token is preferably stored directly in a data memory of the holder.

For the removal, it is advantageous if the token is mechanically pressed slightly out of the holder after the locking of the smartphone. This signals to the user that the locking was executed correctly, that the smartphone is secured, and the token can be removed. For that purpose, the fastening mechanism is connected to the mechanics of the insertion opening such that a locking of the fastening mechanism is accompanied by a release of the token and a shortening of the depth of the insertion opening available to the token.

A release of the locking mechanism or locking mechanisms is only possible if a suitable token is once again inserted in the insertion opening in the holder, and the authorization check of the token was positive. If this is the case, the retaining bracket and, if applicable, the connection means locking the holder on the shopping cart are released and the token is secured against removal in the holder.

As was already mentioned, prior to the authorization check, it is verified whether a token was at all inserted in the holder. For that purpose, the previously described mechanism for shortening the depth of the insertion opening available to the token can be used. If the token is completely inserted in the insertion opening, it bears against the mechanism and again presses it deeper into the insertion opening. This movement signals that a token was inserted in the insertion opening.

Prior to the release of the locking mechanism, it can be verified whether the holder is fastened on the shopping cart and/or a smartphone is fastened in the holder. For that purpose, the aforementioned limit switches can be used. In the embodiment with switch or slider, said switch or slider can be moved automatically but also manually from "Closed" to "Open" if the executed queries are positive. As a result, the locking mechanism of the seating is released and, if applicable, also the locking mechanism of the holder on the shopping cart. In no particular sequence, the holder can be subsequently removed from the shopping cart, and the seating for the smartphone can be opened, and the smartphone can be removed from the holder.

In an alternative embodiment hereto, the token has to be inserted in the insertion opening only to the point where its transponder, for example, an RFID chip, can be read by the holder. The required insertion depth can be defined by a stop or a lock-in position, toward which the transponder is guided. If the transponder is read out and verified as being correct, the switch is released. After the release, a manual movement of the switch from "Closed" to "Open" is possible. The movement of the switch from "Closed" to "Open" preferably not only releases the locking mechanism but the token is also pulled further into the insertion opening, thus securing it against removal. The pulling in of the token also signals to the customer that the locking mechanism was released. Alternatively or additionally, the switch can be moved to the open position by inserting the token previously verified as being correct.

A simple safeguard can be provided with elements engaging the contour of the token from behind. It is also possible to insert blockade elements in openings of the token provided for this purpose.

The embodiments described as alternative to one another in this application can have any of the features described for the corresponding other embodiment and make use of their advantages. Insofar, the further features or method steps described in the corresponding context can be used not only for the respective embodiment but also for the alternative embodiment.

BRIEF DESCRIPTION OF THE SEVERAL VIEWS OF THE DRAWING

A preferred embodiment of the holder according to the invention with fastening mechanism shall be explained in more detail using two drawings.

FIG. 1 shows a top view of a holder with a retaining bracket in a basic position, and FIG. 2 shows a top view of the holder according to FIG. 1 with a smartphone inserted in the seating.

DESCRIPTION OF THE INVENTION

The holder 50 shown in FIG. 1 has a seating 51 for a smartphone. The seating 51 comprises a stationary part 52 and a retaining bracket 53 movably mounted on the holder 50. The retaining bracket 53 meshes with the limbs 52a, 52b on the longitudinal side of the stationary part 52, where it is slidably mounted. The meshing prevents that the fastening mechanism is freely accessible and can be manipulated.

On a transverse side of the seating 51 formed by the stationary part 52, a conventional electronic interface 54 is arranged, to which a smartphone can be connected.

The holder 50 has an insertion opening 55, in which a token 56 is held. In a groove 57 of the stationary part 52, a slider 58 is movably mounted. The slider 58 in FIG. 1 is in its second position, in which the fastening mechanism is unlocked. Thus, the mechanism is not blocked and the U-shaped retaining bracket 53 can be pulled out of the limbs 52a, 52b in order to allow for a smartphone to be inserted in the seating 51.

In the basic position of the retaining bracket 53 on the stationary part 52 shown in FIG. 1, the retaining bracket 53, due to its spring load, is inserted in the limbs 52a, 52b to such an extent that a smartphone placed on the interface 54 bears with its rear side against an upper edge 59 of the retaining bracket 53, when tilted into the seating 51. If the retaining bracket 53 is pulled out of the limbs 52a, 52b against the spring load, the seating 51 increases in size. Depending on the size of the smartphone to be inserted, the seating 51 is at some point long enough, and so the smartphone no longer bears against the upper edge 59 but can be completely inserted in the seating 51. Since the lower edge 60 of the retaining bracket 53 protrudes further into the seating 51 than the upper edge 59 and forms a tongue 60, the smartphone inserted in the seating comes to bear against said tongue 60. If the retaining bracket 53 is now released, it is pressed by the spring load against the upper outer edge of the smartphone.

FIG. 2 shows a smartphone 61 inserted in the seating 51 in such a way. The smartphone 61 rests on the tongue 60, which is covered by the smartphone, and with its upper outer edge 62, it bears against the inner side of the bracket 53. Preferably, said contact is in the form of an undercut, and so the smartphone is held between the tongue 60 and the upper edge 59 of the bracket 53. The lower edge 63 of the smartphone also undercuts the stationary part 52 at the lower transverse side of the seating 51. As a result, an unauthorized removal of the smartphone 61 would only be possible with the destruction of the holder 50 and highly probable damage to the smartphone 61.

In this position of the smartphone 61, the slider 58 can be shifted to the first position shown in FIG. 2, in which the retaining bracket 53 is locked and can no longer be moved. Once the locking is completed, it is signaled by the token 56 being slightly pushed out of the insertion opening 55. The customer using the holder now knows that the smartphone is locked, and the token can be removed.

The invention claimed is:

1. A method for detachably fastening a smartphone holder to a shopping cart, the method comprising:
   in a first step, placing a smartphone on a seating of the smartphone holder;
   in a second step, locking the smartphone in the seating, the locking step activating a locking mechanism to automatically lock a holder in the seating, the holder being inserted in a seating provided for that purpose on the shopping cart;
   releasing a token from an insertion opening of the holder when the smartphone is locked in the holder; and
   inserting the token into the insertion opening to release the locking mechanism, by inserting the token to a first position in the insertion opening, executing an authorization check and, in case of a positive authorization check, enabling a manual release of the locking mechanism and, when the locking mechanism is released, causing the token to be pulled deeper into the holder.

2. The method according to claim 1, wherein an insertion of the holder in the seating on the shopping cart is verified by a limit switch, wherein a signal triggered by the limit switch activates the locking mechanism locking the holder in the seating on the shopping cart.

\* \* \* \* \*